(12) United States Patent  (10) Patent No.: US 9,014,304 B2
Sasahara  (45) Date of Patent: Apr. 21, 2015

(54) DEMODULATION METHOD, DEMODULATION DEVICE, AND ELECTRONIC APPARATUS

(71) Applicant: Seiko Epson Corporation, Tokyo (JP)

(72) Inventor: Hideo Sasahara, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/138,689

(22) Filed: Dec. 23, 2013

(65) Prior Publication Data

US 2014/0177759 A1  Jun. 26, 2014

(30) Foreign Application Priority Data

Dec. 25, 2012  (JP) ................................ 2012-280697

(51) Int. Cl.
*H03K 9/00* (2006.01)
*H04L 27/00* (2006.01)
*H04L 27/22* (2006.01)

(52) U.S. Cl.
CPC ..................................... *H04L 27/22* (2013.01)

(58) Field of Classification Search
USPC .................................. 375/316, 324, 340, 219
See application file for complete search history.

(56) References Cited

U.S. PATENT DOCUMENTS

| 5,768,319 A | 6/1998 | Durboraw, III |
| 2004/0087270 A1* | 5/2004 | Krasner ..................... 455/12.1 |
| 2004/0165649 A1* | 8/2004 | Takahashi et al. ............ 375/134 |
| 2006/0055597 A1* | 3/2006 | Kato et al. ............... 342/357.12 |
| 2011/0161773 A1* | 6/2011 | Martwick et al. ............. 714/755 |
| 2013/0142240 A1* | 6/2013 | Sasahara et al. ............. 375/224 |
| 2013/0229304 A1* | 9/2013 | Sasahara et al. ......... 342/357.58 |

* cited by examiner

*Primary Examiner* — Ted Wang

(74) *Attorney, Agent, or Firm* — Harness, Dickey & Pierce, P.L.C.

(57) ABSTRACT

A satellite signal which carries a navigation message including satellite-specific information is received. Data of the navigation message is demodulated from received satellite signal. Error detection processing is carried out on demodulated data on a word basis of the navigation message. The number of bit transitions is counted at each corresponding bit transition position with respect to a first word in which an error is detected in the error detection processing and which carries the satellite-specific information, and plural second words belonging to a different frame from a frame to which the first word belongs and having a common part with the first word. A bit value of the first word is detected based on the number of bit transitions counted.

5 Claims, 5 Drawing Sheets

DEMODULATION METHOD, DEMODULATION DEVICE, AND ELECTRONIC APPARATUS

This application claims priority to Japanese Patent Application No. 2012-280697, filed Dec. 25, 2012, the entirety of which is hereby incorporated by reference.

BACKGROUND

1. Technical Field

The present invention relates to a demodulation method and a demodulation device for demodulating data of a navigation message modulated by the BPSK (Binary Phase Shift Keying) modulation system.

2. Related Art

As a positioning system utilizing a position signal, the GPS (Global Positioning System) is widely known and used for a receiving device installed inside a mobile phone, car navigation system and the like. In the GPS, the positions of plural GPS satellites, the pseudo-distance from each GPS satellite to the receiving device and the like are found, using clocked time of the GPS receiver, and ultimately the position is computed.

A GPS satellite includes information about satellite orbit, time and the like into a navigation message and transmits the information at a bit rate of 50 bps (bits per second). A navigation message includes a master frame. A master frame includes 25 1500-bit frames.

The receiving environment of GPS satellite signals varies depending on the position of the receiving device and the like. In a weak electric field environment, since the signal intensity of a received signal is very weak, there is a possibility that a change in the bit value (bit transition) of a navigation message cannot be detected accurately, causing an error in demodulation of the received signal. Therefore, as a technique for determining whether a received signal is correctly modulated or not, error detection is known in which whether each word included in each sub-frame of a navigation message is correctly demodulated or not is examined, using an error detection bit included in the navigation message. However, in a weak electric field environment, as described above, since the signal intensity of the received signal is very weak, a change in the bit value (bit transition) of the navigation message cannot be detected accurately. Therefore, in some cases, whether a bit determined as having an error really has an error, and whether the other bits really have no errors cannot be determined accurately. Thus, a technique in which the bit value of each bit is decided by adding a bit transition if there is a bit determined as having an error is known (see, for example, U.S. Pat. No. 5,768,319).

However, U.S. Pat. No. 5,768,319 has a problem that a bit transition is added to all the 1500 bits, that is, even to the bit of a word that is not used for positioning, thus leasing to an increase in memory volume in demodulation processing.

SUMMARY

An advantage of some aspects of the invention is to solve at least a part of the problems described above, and the invention can be implemented as the following forms or application examples.

Application Example 1

A demodulation method according to this application example includes: receiving a satellite signal which carries a navigation message including satellite-specific information; demodulating data of the navigation message from the received satellite signal; carrying out error detection processing on the demodulated data on a word basis of the navigation message; counting the number of bit transitions at each corresponding bit transition position with respect to a first word in which an error is detected in the error detection processing and which carries the satellite-specific information, and plural second words belonging to a different frame from a frame to which the first word belongs and having a common part with the first word; and detecting a bit value of the first word based on the number of bit transitions counted.

According to this application example, instead of counting the number of bit transitions with respect to all the data in which an error is detected in the error detection processing, the number of bit transitions is counted at each corresponding bit transition position with respect to a first word in which an error is detected in the error detection processing and which carries the satellite-specific information, and plural second words belonging to a different frame from a frame to which the first word belongs and having a common part with the first word. Therefore, a memory for storing the number of bit transitions with respect to other words than the word which carries the satellite-specific information is not necessary and the memory volume in demodulation processing can be reduced.

Application Example 2

In the demodulation method according to above application example, it is preferable that the counting of the number of bit transitions is not carried out with respect to other words than the word which carries the satellite-specific information.

According to this application example, with respect to other words than the word which carries the satellite-specific information, the number of bit transitions is not counted even if an error is detected therein. Therefore, bit value decision processing in this data portion can be omitted. Thus, a reduction in the memory volume and a reduction in the demodulation processing time can be realized.

Application Example 3

In the demodulation method according to the above application example, it is preferable that detecting of the bit value of the first word includes: determining whether there is a bit transition or not at each bit transition position, based on the number of bit transitions counted; and detecting each bit value of the first word based on the determining on whether there is a bit transition or not at each bit transition position.

According to this application example, whether there is a bit transition or not at each bit transition position is decided (determined) based on the number of bit transitions counted, and each bit value of the first word is decided(detected) based on the decision(determining) on whether there is a bit transition or not at each bit transition position. Therefore, each bit value of the word in which an error is detected can be decided (detected) more securely.

Application Example 4

A demodulation device according to this application example includes: a receiving unit which receives a satellite signal which carries a navigation message including satellite-specific information; a demodulation unit which demodulates data of the navigation message from the received satellite signal; an error detection processing unit which carries out error detection processing on the demodulated data on a word basis of the navigation message; a bit transition count unit which counts the number of bit transitions at each corresponding bit transition position with respect to a first word in which an error is detected in the error detection processing and which carries the satellite-specific information, and plural second words belonging to a different frame from a frame to which the first word belongs and having a common part with the first word; and a data detection unit which detects a bit value of the first word based on the number of bit transitions counted.

According to this application example, instead of counting the number of bit transitions with respect to all the data in which an error is detected in the error detection processing, the number of bit transitions is counted at each corresponding bit transition position with respect to a first word in which an error is detected in the error detection processing and which carries the satellite-specific information, and plural second words belonging to a different frame from a frame to which the first word belongs and having a common part with the first word. Therefore, a memory for storing the number of bit transitions with respect to other words than the word which carries the satellite-specific information is not necessary and the memory volume in demodulation processing can be reduced.

Application Example 5

An electronic apparatus according to this application example includes the demodulation device according to the above application example 4.

According to this application example, demodulation with a reduced memory volume can be realized in the electronic apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings. Here, an example with a mobile phone will be described as an example of an electronic apparatus having a demodulation device. As a matter of course, an example to which the invention can be applied is not limited to the following example.

1. Configuration of Mobile Phone

Figure 1:
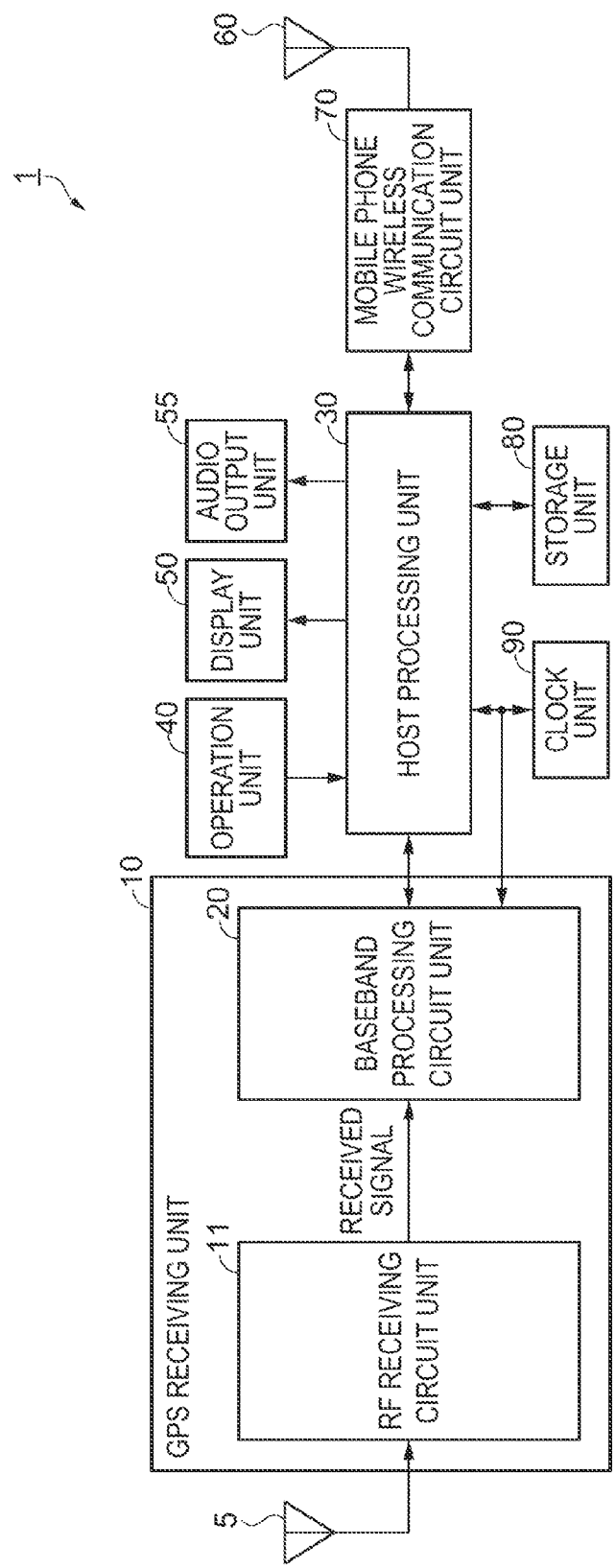
FIG. 1 is a block diagram showing an example of the functional configuration of a mobile phone.

FIG. 1 is a block diagram showing an example of a functional configuration of a mobile phone 1. The mobile phone 1 includes a GPS antenna 5, a GPS receiving unit 10, a host processing unit 30, an operation unit 40, a display unit 50, an audio output unit 55, a mobile phone antenna 60, a mobile phone wireless communication circuit unit 70, a storage unit 80, and a clock unit 90.

The GPS antenna 50 is an antenna which receives an RF (Radio Frequency) signal including a GPS satellite signal sent from a GPS satellite and outputs the received signal to the GPS receiving unit 10.

The GPS receiving unit 10 is a demodulation device which carries out demodulation processing, described later, based on the signal outputted from the GPS antenna 5. The GPS receiving unit 10 is also a circuit or device which calculates the position of the mobile phone 1.

The GPS receiving unit 10 as a demodulation device includes an RF receiving circuit unit 11 and a baseband processing circuit unit 20. The RF receiving circuit unit 11 and the baseband processing circuit unit 20 can be produced as separate LSI (Large Scale Integration) circuits or can be produced as one chip.

The RF receiving circuit unit 11 is a receiving unit which receives a GPS satellite signal. The circuit configuration thereof may be, for example, a receiving circuit which converts an RF signal outputted from the GPS antenna 5 into a digital signal by an A/D converter and then processes the digital signal. Alternatively, a configuration in which an RF signal outputted from the GPS antenna 5 is processed as an analog signal and then A/D-converted and a digital signal is thus outputted to the baseband processing circuit unit 20, may be employed.

In the latter case, the RF receiving circuit unit 11 may be configured, for example, as follows. That is, frequency division or multiplication of a predetermined oscillation signal is carried out to generate an oscillation signal for RF signal multiplication. Then, an RF signal outputted from the GPS antenna 5 is multiplied by the resulting oscillation signal. Thus, the RF signal is down-converted to a signal with an intermediate frequency (hereinafter referred to as an "IF (Intermediate Frequency) signal"). The IF signal is amplified or the like, then converted to a digital signal by the A/D converter, and outputted to the baseband processing circuit unit 20.

The baseband processing circuit unit 20 carries out carrier removal, correlation calculation and the like with respect to the received signal outputted from the RF receiving circuit unit 11, thus captures the GPS satellite signal, and calculates the position and clock error of the mobile phone 1, using time information, satellite orbit information and the like extracted from the GPS satellite signal.

The host processing unit 30 is a processor which centrally controls each part of the mobile phone 1 according to various programs such as a system program stored in the storage unit 80, and includes a processor such as a CPU (Central Processing Unit). Based on position coordinates acquired from the baseband processing circuit unit 20, the host processing unit 30 causes the display unit 50 to display a map on which the current position is pointed out, and utilizes the position coordinates for various kinds of application processing.

The operation unit 40 is, for example, an input device including a touch panel, a button switch and the like, and outputs signals of keys and buttons that are pressed, to the host processing unit 30. By operating the operation unit 40, various instruction operations such as communication request, email sending/receiving request, position calculation request, and position display request are carried out.

The display unit 50 is a display device having an LCD (Liquid Crystal Display) and the like and carries out various displays based on display signals outputted from the host processing unit 30. Various kinds of information such as time information and position information are displayed on the display unit 50.

The audio output unit 55 is an audio output device having a speaker and the like and carries out various audio outputs based on audio output signals outputted form the host processing unit 30. Voices during phone calls, audio guidance according to various applications and the like are outputted from the audio output unit 55.

The mobile phone antenna 60 is an antenna which sends and receives a mobile phone wireless signal to and from a wireless base station installed by the communication service provider of the mobile phone 1.

The mobile phone wireless communication circuit unit 70 is a communication circuit unit of the mobile phone including an RF conversion circuit, a baseband processing circuit and the like, and carries out modulation, demodulation and the like of a mobile phone wireless signal, thus realizing a phone call, sending and receiving of an email or the like.

The storage unit 80 has a storage device such as ROM (Read Only Memory), flash ROM or RAM (Random Access Memory) and stores a system program for the host processing unit 30 to control the mobile phone 1, and various programs and data to execute various kinds of application processing.

The clock unit 90 is an internal clock of the mobile phone 1 and has a crystal oscillating device made up of a crystal oscillator and an oscillation circuit. The clocked time of the clock unit 90 is outputted to the baseband processing circuit unit 20 and the host processing unit 30 at all times. The clocked timed of the clock unit 90 is corrected based on a clock error calculated by the baseband processing circuit unit 20.

2. Circuit Configuration of Baseband Processing Circuit Unit

Figure 2:
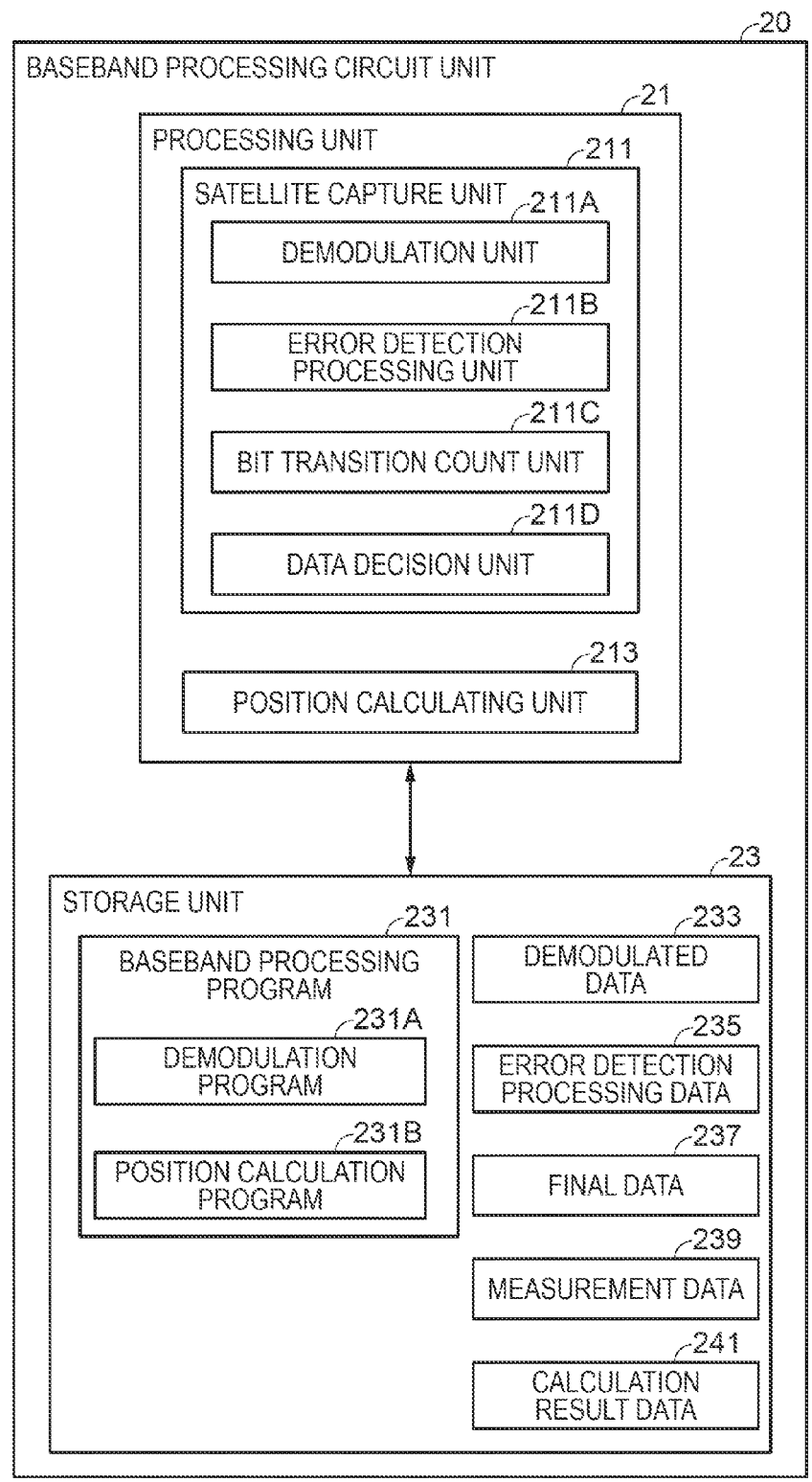
FIG. 2 is a block diagram showing an example of the circuit configuration of a baseband processing circuit unit.

FIG. 2 is a block diagram showing an example of the circuit configuration of the baseband processing circuit unit 20, mainly showing circuit blocks involved in this embodiment example. The baseband processing circuit unit 20 has a processing unit 21 and a storage unit 23 as principal components thereof.

The processing unit 21 is a control device and arithmetic device which centrally controls each functional unit in the baseband processing circuit unit 20 and has a processor such as CPU or DSP (Digital Signal Processor). The processing unit 21 has a satellite capture unit 211 and a position calculating unit 213 as principal functional units thereof.

The satellite capture unit 211 is a functional unit which captures a GPS satellite. Specifically, the satellite capture unit 211 executes digital signal processing such as carrier removal and correlation calculation on a digital signal outputted from the RF receiving circuit unit 11 and captures a GPS satellite based on the result of the digital signal processing.

In this embodiment, the satellite capture unit 211 has a demodulation unit 211A, an error detection processing unit 211B, a bit transition count unit 211C, and a data decision unit 211D (a data detection unit 211D) as functional units thereof. However, these functional units are described simply as an example. Not all these functional units must be essential components.

The demodulation unit 211A demodulates data of a navigation message from a GPS satellite signal according to a demodulation program 231A stored in the storage unit 23. The demodulated data of the navigation message is stored in the storage unit 23 as demodulated data 233.

The error detection processing unit 211B carries out error detection processing on the demodulated data 233 according to the demodulation program 231A stored in the storage unit 23. Specifically, the error detection processing unit 211B carries out error detection processing on the demodulated data 233 according to a prescribed computation formula of error detection processing, on a word basis of the navigation message. The computation formula of error detection processing prescribed in the GPS is already known and therefore will not be described further in detail here. The result of the error detection processing on each word is stored in the storage unit 23 as error detection processing data 235.

Here, in the satellite positioning system utilizing the GPS, a GPS satellite, which is a kind of positioning satellite, sends a navigation message including satellite orbit data such as ephemeris and almanac data on a GPS satellite signal.

Figure 3:
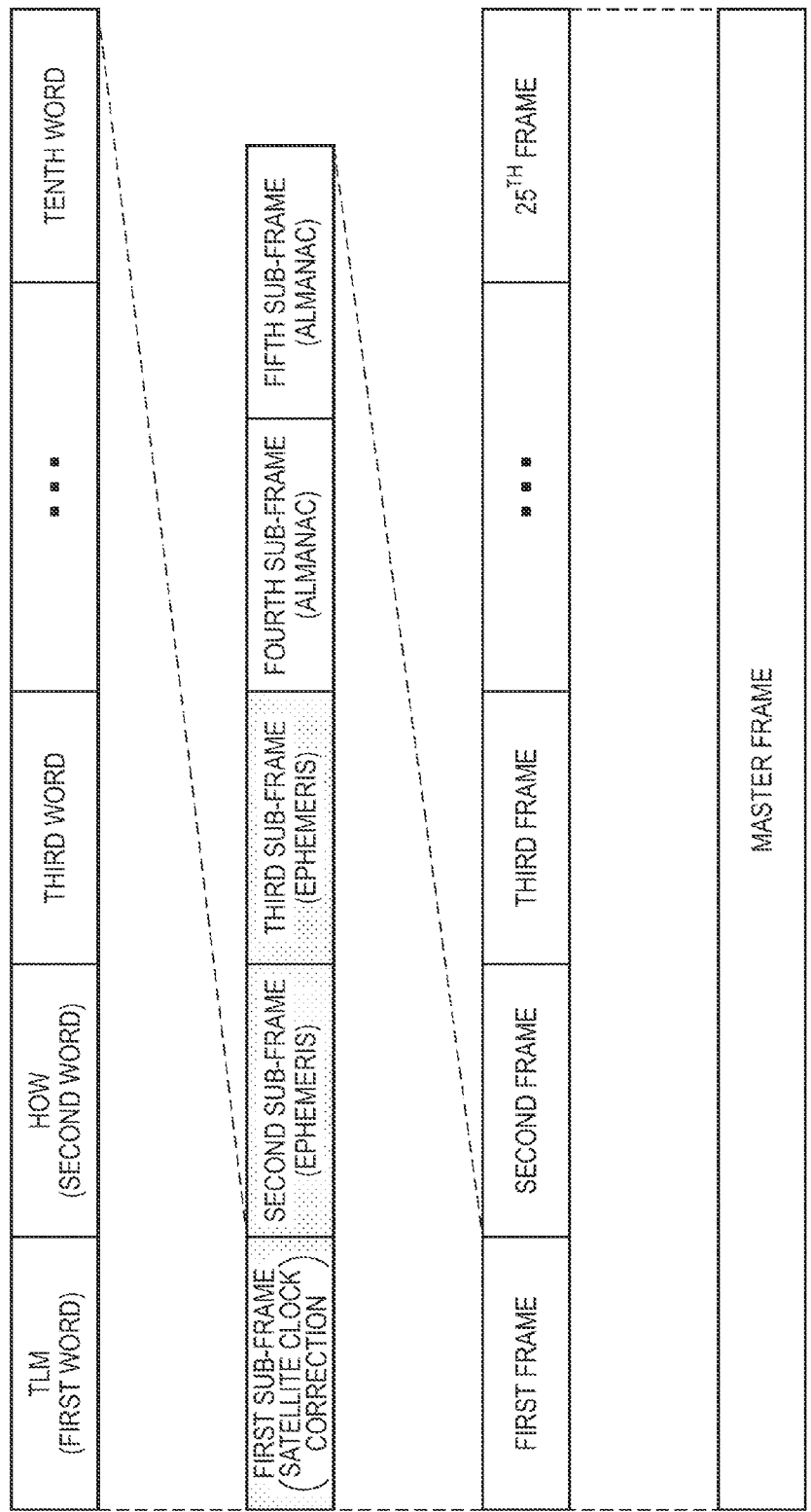
FIG. 3 is an explanatory view of a navigation message.

FIG. 3 is an explanatory view of a navigation message. A GPS satellite transmits a navigation message at a bit rate of 50 bps (bits per second). A navigation message includes a master frame. A master frame includes 25 frames (first to 25-th frames). A frame includes 1500 bits. Since the bit rate is 50 bps, it takes 20 milliseconds to receive one bit of a navigation message. Therefore, it takes 30 seconds to receive a frame.

Each frame includes five sub-frames (first to fifth sub-frames). In the first to third sub-frames, the same information as other frames is stored. In the fourth and fifth sub-frames, different information from other frames is stored. The information stored in the fourth and fifth sub-frames is information of different pages of the navigation message. Therefore, in order to acquire the entire navigation message, the 25 frames as the master frame need to be received and this takes 12.5 minutes.

Each sub-frame includes ten words (first to tenth words). The first word is called a TeLeMetry word (TLM word) and includes an 8-bit synchronization pattern and a 14-bit message. The second word is called a Hand Over Word (HOW) and stores time information called ZCOUNT (the number of seconds elapsed from the beginning of the week) and sub-frame ID indicating the sub-frame number. In the third to tenth words, different information from other sub-frames is stored.

In the first sub-frame, a satellite clock correction coefficient, satellite health status and the like are stored. In the second and third sub-frames, a value of satellite orbit history parameter (ephemeris parameter) is stored. Each word in each of these sub-frames is a data part where information specific to the GPS satellite is stored.

However, of the first to tenth words forming the first to third sub-frames, the data content carried in the first and second words may differ between frames. That is, in the first and second words, information of the same content is not necessarily carried repeatedly. Thus, in this embodiment, of the ten words forming the first to third sub-frames, the third to tenth words where information of the same content is carried repeatedly every 30 seconds are taken as satellite-specific information.

Back to the explanation of FIG. 2, the bit transition count unit 211C counts the number of bit transitions at every corresponding bit transition position with respect to a word (first word) in which an error is detected in the error detection processing and which carries satellite-specific information, and plural words (second words) belonging to a different frame from the frame to which the first word belongs and having a common part with the first word, according to the demodulation program 231A stored in the storage unit 23 (bit transition count processing). The bit transition count processing will be described later.

The data decision unit 211D (the data detection unit 211D) causes the storage unit 23 to store the bit value of each word which carries satellite-specific information as final data 237, according to the demodulation program 231A stored in the storage unit 23.

Specifically, with respect to a word in which no error is detected in the error detection processing by the error detection processing unit 211B, of the words which carry satellite-specific information, the bit value demodulated by the demodulation unit 211A is stored in the storage unit 23. Meanwhile, with respect to a word in which an error is detected in the error detection processing by the error detection processing unit 211B, of the words which carry satellite-specific information, each bit value is decided based on the number of bit transitions counted by the bit transition count unit 211C (error bit decision processing) and the bit value is stored in the storage unit 23. The error bit decision processing will be described later.

The processing by the satellite capture unit 211 is carried out for each satellite. The processing by the satellite capture unit 211 may be carried out on all the GPS satellites, or the processing by the satellite capture unit 211 may be carried out on at least four GPS satellites used for positioning.

The position calculating unit 213 carries out known position calculation processing using a navigation message (specifically, the final data 237) of GPS satellites (for example, four GPS satellites) used for positioning and measurement data 239 that is measurement information such as code phase, Doppler frequency and the like acquired on these GPS satellites, according to a position calculation program 231B stored in the storage unit 23, and calculates the position (position coordinates) and clock error (clock bias) of the mobile phone 1. The calculated position and clock error are stored in the storage unit 23 as calculation result data 241.

The storage unit 23 stores the system program of the baseband processing circuit unit 20 and various programs, data and the like to realize various functions such as satellite capture function, received signal demodulation function, error detection function, and position calculation function. The storage unit 23 also has a work area which temporarily stores data that is being processed and processing results of various kinds of processing.

In the storage unit 23, a baseband processing program 231 that is read out by the processing unit 21 and executed as baseband processing is stored. The baseband processing program 231 includes the demodulation program 231A executed as demodulation processing, and the position calculation program 231B executed as position calculation processing, as sub-routines. The position calculation processing is already known and therefore explanation thereof with a flowchart is omitted.

Also, in the storage unit 23, the demodulation data 233, the error detection processing data 235, the final data 237, the measurement data 239, and the calculation result data 241 are stored as principal data.

3. Demodulation Method

Figure 4:
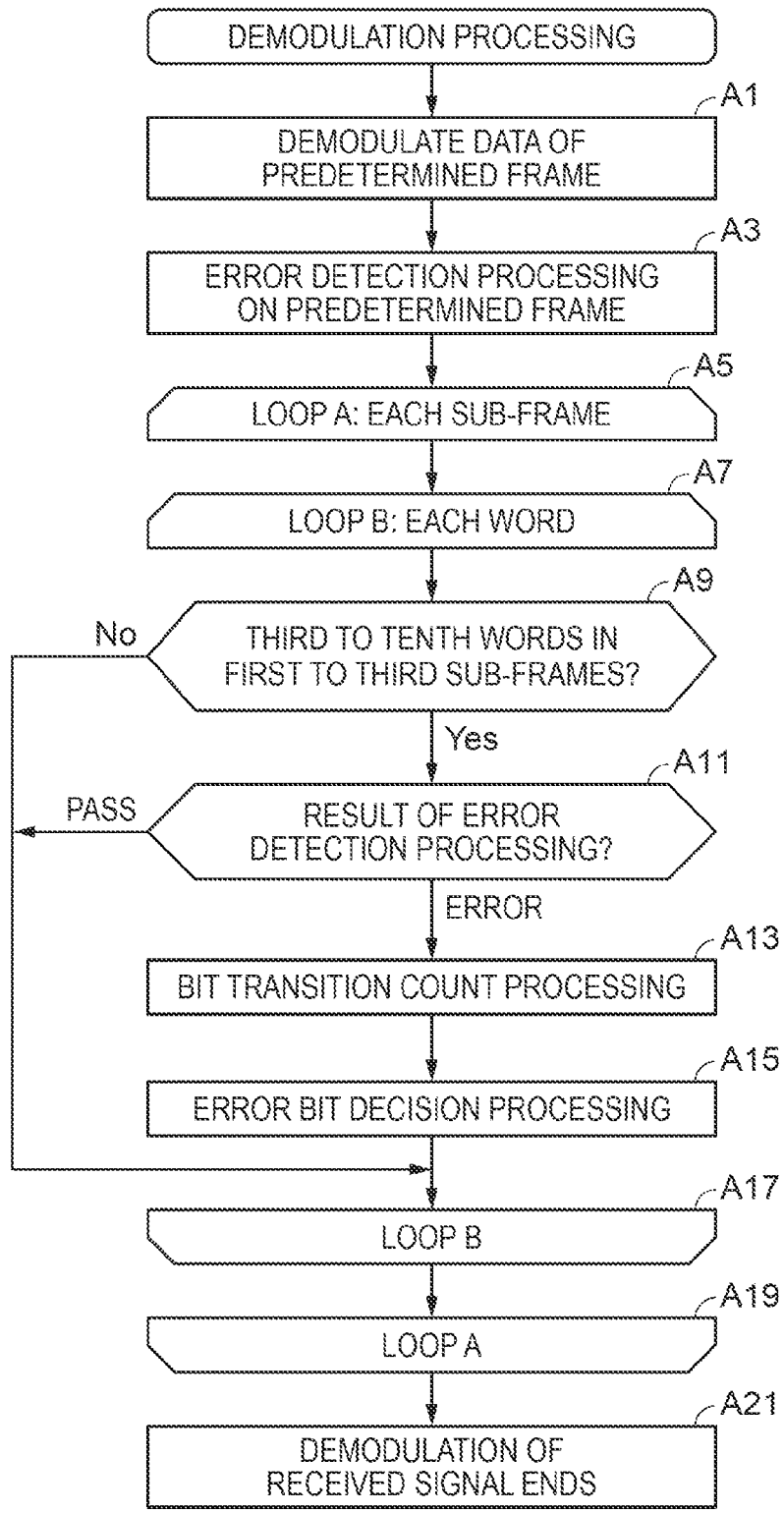
FIG. 4 is a flowchart showing a flow of demodulation processing (demodulation method).

FIG. 4 is a flowchart showing the flow of demodulation processing (demodulation method) executed by the processing unit 21 of the baseband processing circuit unit 20 according to the demodulation program 231A stored in the storage unit 23. This demodulation processing is carried out, targeting each GPS satellite used for positioning.

The demodulation unit 211A demodulates data of a predetermined frame (in this embodiment, for example, 15 frames) of a navigation message from a received GPS satellite signal (step A1). Hereinafter, the demodulated frames are referred to as a frame 1, a frame 2, . . . a frame 15 in order from the leading end.

When the demodulation of the data of the predetermined frame is completed, the error detection processing unit 211B carries out error detection processing on a word basis with respect to a predetermined frame (in this embodiment, for example, the frame 1) from among the demodulated frames (step A3).

When the error detection processing is completed, the satellite capture unit 211 carries out processing of a loop A on the frame on which the error detection processing is carried out (in this embodiment, the frame 1) (steps A5 to A19).

In the processing of the loop A, the satellite capture unit 211 carries out processing of a loop B on each word included in each sub-frame in the frame on which the error detection processing is carried out (steps A7 to A17). In the processing of the loop B, bit transition count processing and error bit decision processing are carried out on the third to tenth words in the first to third sub-frames, which are satellite-specific information. Therefore, the memory volume in the demodulation processing can be reduced. Also, in the processing of the loop B, the bit transition count processing and the error bit decision processing are not carried out on the other words than the third to tenth words in the first to third sub-frames, which are satellite-specific information. Therefore, not only a reduction in the memory volume but also a reduction in the demodulation processing time can be realized. Moreover, since the bit transition count processing and the error bit decision processing are carried out on the third to tenth words in the first to third sub-frames carrying the same information repeatedly, the bit value of each bit of the data where an error is detected can be decided more securely.

Specifically, the satellite capture unit 211 first determines whether the word on which the processing of the loop B is currently carried out corresponds to one of the third to tenth words in the first to third sub-frames or not (step A9).

If the word does not correspond to any of the third to tenth words in the first to third sub-frames (step A9; No), the processing proceeds to the next word.

Meanwhile, if the word corresponds to one of the third to tenth words in the first to third sub-frames (step A9; Yes), the data decision unit 211D refers to the result of the error detection processing on the word stored in the error detection processing data 235. If no error is detected in the word (step A11; pass), the data decision unit 211D stores the bit value of the word in the final data 237. Then, the processing proceeds to the next word.

Meanwhile, if an error is detected in the word (step A11; Error), the bit transition count unit 211C carries out the bit transition count processing on the word (step A13). When the bit transition count processing is completed, the data decision unit 211D carries out the error bit decision processing on the word, based on the result of the bit transition count processing (step A15). Then, the data decision unit 211D stores the bit value in the final data 237 and shifts the processing to the next word.

After the processing of steps A9 to A15 is carried out on all the words included in each sub-frame in the frame where the error detection processing is carried out, the satellite capture unit 211 ends the processing of the loop B (step A17). Then, after the processing of steps A7 to A17 is carried out on all the sub-frames in the frame where the error detection processing is carried out, the satellite capture unit 211 ends the processing of the loop A (step A19).

As the processing of the loop A ends, the demodulation processing ends (step A21). This completes the final data 237 used in position calculation processing.

4. Bit Transition Count Processing

Figure 5:
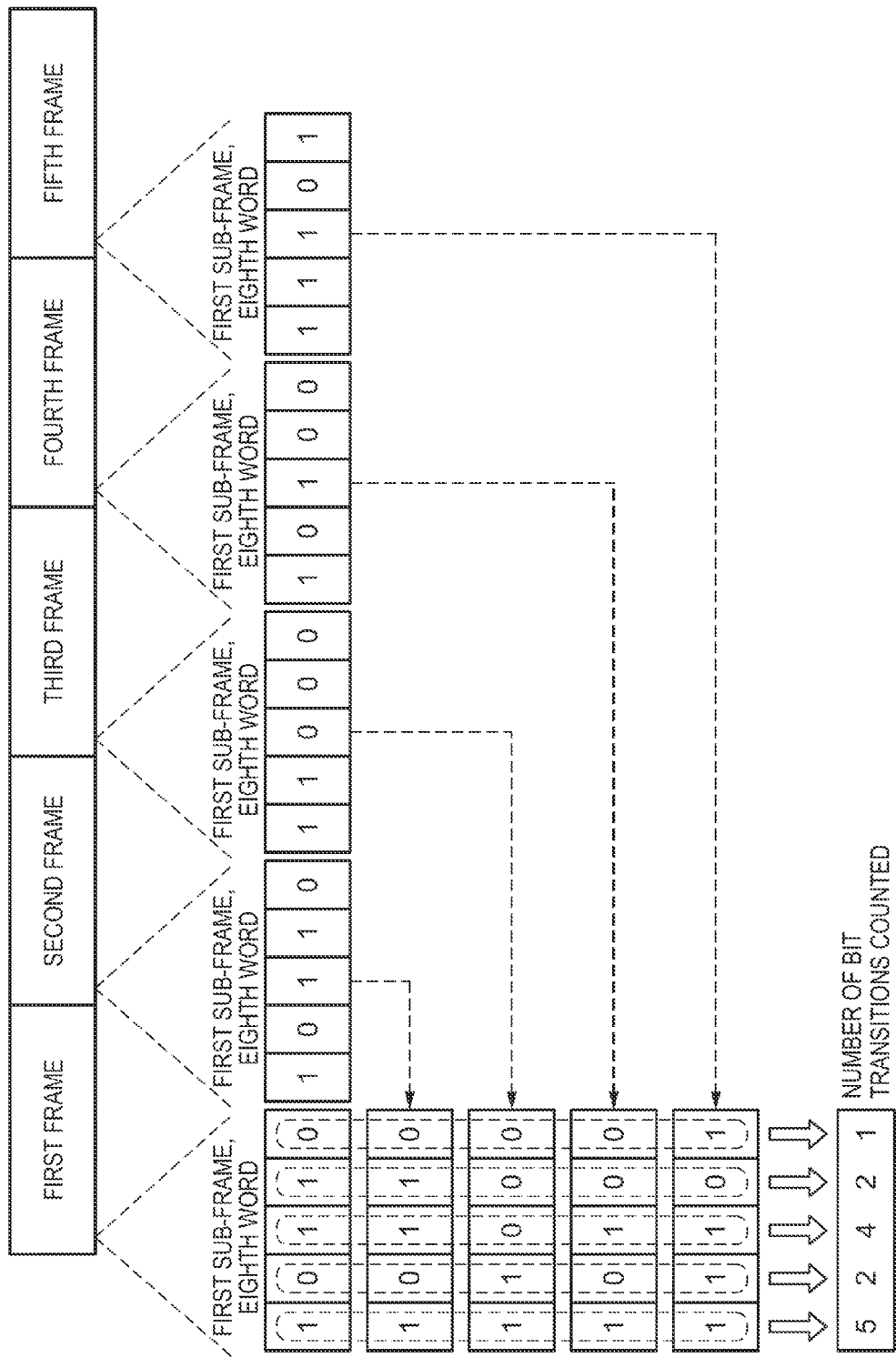
FIG. 5 is an explanatory view of bit transition count processing.

FIG. 5 is an explanatory view of the bit transition count processing in this embodiment. As described above, the bit transition count unit 211C counts the number of bit transitions at each corresponding bit transition position with respect to a word (first word) in which an error is detected by the error detection processing and which carries satellite-specific information, and plural words (second words) belonging to a different frame from the frame to which the first word belongs and having a common part with the first word.

In FIG. 5, the bit transition count processing is explained, using an example case where the error detection processing is carried out on the eighth word in the first sub-frame in the first frame and an error is detected. In FIG. 5, to simply the explanation, the number of bits of the eighth word in the first sub-frame is assumed to be 5 bits. The first to fifth frames in FIG. 5 are carried every 30 seconds, as described above. The numbers "0" and "1" in FIG. 5 indicates whether there is a bit transition of the bit value in question from the immediately preceding bit value (inversion of the bit value) or not. "0" indicates that there is no bit transition of the bit value in question from the immediately preceding bit value (there is no inversion of the bit value). "1" indicates that there is a bit transition of the bit value in question from the immediately preceding bit value (there is inversion of the bit value).

In the case where an error is detected in the eighth word in the first sub-frame in the first frame, the bit transition count unit 211C counts the number of bit transitions (in this embodiment, for example, the number of times "there is a bit transition") at each corresponding bit transition position with respect to the eighth word in the first sub-frame in the first frame (first word) and each eighth word in each first sub-frame in the second to fifth frames (second words). Therefore, in FIG. 5, the number of bit transitions counted by the bit transition count unit 211C is 5, 2, 4, 2, 1 in order from the left.

5. Error Bit Decision Processing

As described above, the data decision unit 211D decides each bit value of the word where an error is detected by the error detection processing unit 211B, based on the number of bit transitions counted by the bit transition count unit 211C.

Specifically, first, whether there is a bit transition or not at each bit transition position is determined based on the number of bit transitions counted by the bit transition count unit 211C. For example, the same numeric value as the majority of the number of frames used in counting bit transitions is set as a threshold value. If the number of bit transitions counted is larger than the threshold value, the bit transition at the bit transition position may be decided as "1", whereas if the number of bit transitions counted is smaller than the threshold value, the bit transition at the bit transition position may be decided as "0". According to the example of FIG. 5, the number of bit transitions counted by the bit transition count unit 211C is 5, 2, 4, 2, 1 and the number of frames used in counting bit transitions is 5. Therefore, if "3" is set as the threshold value, whether there is a bit transition or not at each bit transition position can be decided as "10100" from the left bit.

Next, after whether there is a bit transition or not at each bit transition position is decided, the bit value of each bit is decided based on this decision on whether there is a bit transition or not. According to the example of FIG. 5, whether there is a bit transition or not at each bit transition position is expressed as "10100" from the left bit. Therefore, for example, if the bit value of the bit immediately preceding the five bits is assumed to be "0", the bit value of the eighth word in the first sub-frame can be decided as "11000".

6. Effects and Advantages

In the baseband processing circuit unit 20, the demodulation unit 211A demodulates a received GPS satellite signal carrying a navigation message. Then, the error detection processing unit 211B carries out error detection processing on the demodulated data on a word basis of the navigation message. The bit transition count unit 211C counts the number of bit transitions at each corresponding bit transition position with respect to a first word in which an error is detected by the error detection processing and which carries satellite-specific information, and plural second words belonging to a different frame from the frame to which the first word belongs and having a common part with the first word. The data decision unit 211D decides whether there is a bit transition or not at each bit transition position, based on the number of bit transitions counted, and decides each bit value of the first word based on the decision on whether there is a bit transition or not at each bit transition position.

Of the navigation message, the third to tenth words in the first to third sub-frames, which are satellite-specific information, are minimum necessary information for position calculation. In this embodiment, bit transition count processing and error bit decision processing are carried out on these words, and the bit transition count processing and the error bit decision processing are not carried out on the other words. Therefore, a reduction in the memory volume in the demodulation processing of the navigation message can be realized and the time of the demodulation processing of the navigation message can be reduced. Moreover, since each bit value of the first word where an error is detected is decided based on the number of bit transitions counted, each bit value of the word where an error is detected can be decided more securely.

7. Modifications

As a matter of course, embodiments to which the invention can be applied are not limited to the foregoing embodiment and suitable changes can be made without departing from the scope of the invention. Hereinafter, modifications will be described. In the description of the modifications, the same configurations as the embodiment are denoted by the same reference numerals and will not be described further in detail.

7-1. Demodulation Processing

In the embodiment, the demodulation processing is carried out on 15 frames. However, the number of frames on which the demodulation processing is carried out not limited to this and may be five frames or 25 frames.

7-2. Error Detection Processing

In the embodiment, the error detection processing is carried out only on one frame, of the frames on which the demodulation processing is carried out. However, the error detection processing may be carried out on all the frames on which the demodulation processing is carried out.

7-3. Electronic Apparatus

In the embodiment, the case where the invention is applied to a mobile phone as a type of electronic apparatus is described as an example. However, electronic apparatuses to which the invention can be applied are not limited to this. For example, the invention can similarly be applied to other electronic apparatuses such as a car navigation system, portable navigation system, personal computer, PDA (Personal Digital Assistant), and wristwatch.

7-4. Agent of Processing

In the embodiment, it is assumed that the processing unit in the baseband processing circuit unit 20 executes the demodulation processing, the error detection processing, and the bit transition count processing of a received signal of a carrier wave. However, the host processing unit 30 may execute a part or the whole of these kinds of processing.

For example, the processing may be distributed between the baseband processing circuit unit 20 and the host processing unit 30 in such a way that the demodulation and the error detection processing of the received signal of the carrier wave are executed by the processing unit in the baseband processing circuit unit 20, whereas the bit transition count processing is executed by the host processing unit 30.

7-5. Satellite Positioning System

In the embodiment, the GPS is used as an example of a satellite positioning system. However, other satellite positioning systems such as the WAAS (Wide Area Augmentation System), QZSS (Quasi Zenith Satellite System), GLONASS (GLObal NAvigation Satellite System), and GALILEO may also be used.

What is claimed is:

1. A demodulation method comprising:
   receiving, by a processor unit, a satellite signal which carries a navigation message including satellite-specific information;
   demodulating data of the navigation message from received satellite signal;
   carrying out error detection processing on demodulated data on a word basis of the navigation message;
   counting the number of bit transitions at each corresponding bit transition position with respect to a first word in which an error is detected in the error detection processing and which carries the satellite-specific information, and plural second words belonging to a different frame from a frame to which the first word belongs and having a common part with the first word; and
   detecting a bit value of the first word based on the number of bit transitions counted.

2. The demodulation method according to claim 1, wherein the counting of the number of bit transitions is not carried out with respect to other words than the word which carries the satellite-specific information.

3. The demodulation method according to claim 1, wherein detecting the bit value of the first word includes:
   determining whether there is a bit transition or not at each bit transition position, based on the number of bit transitions counted; and
   detecting each bit value of the first word based on the determining on whether there is a bit transition or not at each bit transition position.

4. A demodulation device comprising:
   a receiving unit which receives a satellite signal which carries a navigation message including satellite-specific information;
   a demodulation unit which demodulates data of navigation message from the received satellite signal;
   an error detection processing unit which carries out error detection processing on demodulated data on a word basis of the navigation message;
   a bit transition count unit which counts the number of bit transitions at each corresponding bit transition position with respect to a first word in which an error is detected in the error detection processing and which carries the satellite-specific information, and plural second words belonging to a different frame from a frame to which the first word belongs and having a common part with the first word; and
   a data detection unit which detects a bit value of the first word based on the number of bit transitions counted.

5. An electronic apparatus comprising the demodulation device according to claim 4.

* * * * *